(12) United States Patent
Ito

(10) Patent No.: US 9,471,487 B2
(45) Date of Patent: Oct. 18, 2016

(54) DATA RESTORATION IN ELECTRONIC DEVICE

(71) Applicant: Onkyo Corporation, Osaka (JP)

(72) Inventor: Kazunari Ito, Osaka (JP)

(73) Assignee: Onkyo Corporation, Osaka (JP)

( * ) Notice: Subject to any disclaimer, the term of this patent is extended or adjusted under 35 U.S.C. 154(b) by 3 days.

(21) Appl. No.: 14/568,379

(22) Filed: Dec. 12, 2014

(65) Prior Publication Data

US 2015/0177992 A1    Jun. 25, 2015

(30) Foreign Application Priority Data

Dec. 20, 2013   (JP) ................. 2013-263790

(51) Int. Cl.
*G06F 3/06* (2006.01)
*G06F 12/02* (2006.01)
*G06F 11/00* (2006.01)

(52) U.S. Cl.
CPC ............ *G06F 12/0246* (2013.01); *G06F 11/00* (2013.01); *G06F 2206/1014* (2013.01); *G06F 2212/1032* (2013.01)

(58) Field of Classification Search
CPC ............. G06F 3/0601; G06F 12/0866; G06F 11/1441; G06F 2003/0697; G06F 11/1435; G06F 11/20; G06F 2003/0692; G06F 11/1456; G06F 11/1461; G06F 11/1666; G06F 11/2089; G06F 2201/835; G06F 12/0246; G06F 11/00; G06F 11/1008; G06F 11/2064; G06F 11/2082; G06F 17/30578; G06F 2206/1014; G06F 2212/1032; G06F 11/1451; G06F 11/1469; G06F 11/1471; G06F 11/2056; G06F 12/14; G06F 13/1657; G06F 13/1689; G06F 13/1694; G06F 2212/222; G06F 2212/312; G06F 2212/7201; G06F 3/0604; G06F 3/061; G06F 3/0619; G06F 3/064; G06F 3/0679; G06F 3/0688; G06F 8/65; G06F 9/4825; G06F 9/544

USPC ......... 711/162, E12.019, 114, 113, 103, 118, 711/119, E12.001, E12.04, E12.103, 135, 711/142, 202, E12.008, 100, 104, 105, 143; 714/E11.12, E11.124, E11.136, 714/E11.138, 38.12

See application file for complete search history.

(56) References Cited

U.S. PATENT DOCUMENTS 6,249,877 B1 *   6/2001   Kawakami ........ G06F 17/30109
                                                            707/E17.007
7,061,812 B2 *   6/2006   Shinagawa ............ G11C 16/16
                                                            365/185.24

(Continued)

FOREIGN PATENT DOCUMENTS

JP    H03-119391 A    5/1991
JP    H0613216 U     2/1994

(Continued)

OTHER PUBLICATIONS

English translation of Chinese Office Action for corresponding Chinese Application No. JP 2013-263790 mailed Dec. 16, 2014.

(Continued)

*Primary Examiner* — Tuan Thai
*Assistant Examiner* — Edward Waddy, Jr.
(74) *Attorney, Agent, or Firm* — Renner, Otto, Boisselle & Sklar, LLP

(57) ABSTRACT

Restoration data is enabled to be written into a nonvolatile memory according to a simple process without using large capacity of a volatile memory.
An SRAM writing section sets an updating request flag in a non-delay updating request flag region corresponding to a non-delay region where the restoration data is written. When the updating request flag is set in the non-delay updating request flag region, an EEPROM writing section writes the restoration data stored in the non-delay region corresponding to the non-delay updating request flag region into an EEPROM.

3 Claims, 11 Drawing Sheets

(56) References Cited

U.S. PATENT DOCUMENTS

| | | | |
|---|---|---|---|
| 7,552,282 B1* | 6/2009 | Bermingham | G06F 12/0802 711/118 |
| 7,805,632 B1* | 9/2010 | Luke | G06F 11/1471 714/36 |
| 2006/0015698 A1* | 1/2006 | Kim | G06F 11/1441 711/162 |
| 2008/0028132 A1* | 1/2008 | Matsuura | G06F 12/0246 711/103 |
| 2009/0281690 A1* | 11/2009 | Sasaki | G06F 11/1441 701/33.4 |
| 2010/0241806 A1 | 9/2010 | Kawano et al. | |
| 2011/0113184 A1* | 5/2011 | Chu | G06F 1/30 711/103 |
| 2013/0179715 A1* | 7/2013 | Sun | G06F 1/3234 713/323 |

FOREIGN PATENT DOCUMENTS

| | | |
|---|---|---|
| JP | 2001-28525 A | 1/2001 |
| JP | 2009-276820 | 11/2009 |
| JP | 2010-224685 | 10/2010 |
| JP | 2011-230569 A | 11/2011 |
| JP | 2012-103967 | 5/2012 |
| JP | 2012-137881 | 7/2012 |

OTHER PUBLICATIONS

Chinese Office Action for corresponding Chinese Application No. JP 2013-263790 mailed Mar. 31, 2015.

Chinese Office Action for corresponding Chinese Application No. JP 2013-263790 mailed Jun. 9, 2015.

Chinese Decision to Grant for corresponding Chinese Application No. JP 2013-263790 mailed Aug. 18, 2015.

* cited by examiner

DATA RESTORATION IN ELECTRONIC DEVICE

BACKGROUND OF THE INVENTION

1. Field of the Invention

The present invention relates to an electronic device having a nonvolatile memory for storing data to be restored.

2. Description of the Related Art

In electronic devices such as AV amplifiers for amplifying audio signals and outputting them to speakers and personal computers, when power supply to a self device is shut off but then the power source is supplied to the self device, a state of the self device is required to be brought into a state before the power supply is shut off. For this reason, a CPU of an electronic device writes data to be restored (hereinafter, referred to as "restoration data"), which is stored in a volatile memory (for example, an SRAM) provided inside a microcomputer into an EEPROM or the like as a nonvolatile memory before the power supply is shut off. When the power source is again supplied, the CPU of the electronic device again writes (copies) the restoration data stored in the nonvolatile memory into the volatile memory, and returns the self device into the state before the power supply is shut off.

It is also considered that at a moment when the power supply to the electronic device is shut off, the restoration data stored in the volatile memory is written into the nonvolatile memory. Since the nonvolatile memory, however, requires a time for data writing, large-capacity restoration data cannot be written into the nonvolatile memory when the power supply is shut off. For this reason, conventionally, every time when the restoration data stored in the volatile memory changes, the restoration data is written into the nonvolatile memory.

Further, the CPU writes data into the volatile memory according to an application program. Restoration data and data that does not have to be restored (hereinafter, referred to as "restoration unnecessary data") are occasionally mixed in the data to be written into the volatile memory. In such a case, when the CPU determines whether the data to be written into the volatile memory is restoration data or restoration unnecessary data according to an application program, a structure of the application program becomes complicated. Further, when the application program is corrected according to a specification change, the number of portions to be corrected increases, and erroneous correction is very likely to occur. In order to avoid this, a structure for allowing the CPU to determine whether the data to be written into the volatile memory is the restoration data or the restoration unnecessary data is not provided to the application program, and the application program only allows the CPU to write data into the volatile memory. Another program allows the CPU to monitor whether the restoration data is written into the volatile memory, namely, whether the restoration data stored in the volatile memory changes. Only when the restoration data changes, a process for writing the restoration data into the nonvolatile memory is executed.

A method for detecting whether restoration data changes includes a method for allowing the CPU to read the restoration data stored in the nonvolatile memory and comparing the read restoration data with the restoration data stored in the volatile memory. When the CPU determines that the read restoration data does not match with the restoration data stored in the volatile memory, the CPU detects a change in the restoration data. The nonvolatile memory is, however, connected mostly by a serial interface (particularly, an EEPROM), and thus constant reading of the restoration data from the nonvolatile memory places a burden on the CPU.

Therefore, in order to reduce an access to the nonvolatile memory, a copy of the restoration data written into the nonvolatile memory is written into the volatile memory. FIG. 11 is a diagram illustrating a conventional process for writing data into the volatile memory (SRAM), and a process for writing data into the nonvolatile memory (EEPROM). FIG. 11 illustrates the writing of data into an EEPROM 103 in a form of hardware, but actually a CPU 101 writes data into the EEPROM 103 according to a program (software module) (software process). Regions D01 to D0N of an SRAM 102 are restoration data regions where restoration data is written. Regions C01 to C0N of the SRAM 102 are restoration data copy regions where copy of restoration data is written. The CPU 101 compares restoration data written into the restoration data regions D01 to D0N with copies of restoration data written into the restoration data copy regions C01 to C0N ((1) in FIG. 11). When the CPU 101 determines that the restoration data does not match with the copy of the restoration data, it writes the restoration data into the EEPROM 103 ((2) in FIG. 11). At the same time, the CPU 101 writes the copy of the restoration data into the restoration data copy regions C01 to C0N ((3) in FIG. 11). However, since the copy of the restoration data is written into the SRAM 102, an extra capacity of the SRAM 102 (the volatile memory) is necessary. Particularly when a capacity of the restoration data is large, a writable region of the SRAM 102 (the volatile memory) becomes small, and this is a problem.

As a method for reducing the capacity of the volatile memory where the copy of the restoration data is written, Japanese Patent Application Laid-Open No. 2012-137881 discloses an invention where only a checksum is written into a volatile memory. According to the invention disclosed in Japanese Patent Application Laid-Open No. 2012-137881, a necessary capacity of the volatile memory is greatly reduced, but a capacity for writing of the checksum is necessary. Further, the CPU bears a burden of calculation of the checksum.

Further, since the number of rewriting times is limited in the nonvolatile memory such as an EEPROM, when restoration data that changes frequently is written into the nonvolatile memory at every change time, a life of the nonvolatile memory is shortened. For this reason, the restoration data that changes frequently is written into the nonvolatile memory after some time (a few seconds) passes from the change in some cases (delay writing). Regions D11 to D1$n$ of the SRAM 102 shown in FIG. 11 are delay restoration data regions where restoration data to be delayed and written is written. Regions C11 to C1$n$ of the SRAM 102 are delay restoration data copy regions where a copy of restoration data to be delayed and written is written. The CPU 101 compares the restoration data written into the delay restoration data regions D11 to D1$n$ with the copy of the restoration data written into the delay restoration data copy regions C01 to C0N ((4) in FIG. 11). When the CPU 101 determines that the restoration data does not match with the copy of the restoration data, it starts a timer ((5) in FIG. 11). When the timer overflows ((6) in FIG. 11), the CPU 101 writes the restoration data into the EEPROM 103 ((7) in FIG. 11). At the same time, the CPU 101 writes the copy of the restoration data into the delay restoration data copy regions C11 to C1$n$ ((8) in FIG. 11). As shown in FIG. 11, the conventional process for writing the restoration data into the nonvolatile memory is very complicated.

As described above, there is a problem that the large capacity of the volatile memory is used in order to write restoration data into the nonvolatile memory. Further, it is also a problem that the conventional process for writing the restoration data into the nonvolatile memory is very complicated.

SUMMARY OF THE INVENTION

It is an object of the present invention to enable restoration data to be written into a nonvolatile memory according to a simple process without using a large capacity of a volatile memory.

An electronic device comprising: a volatile memory having a first region, a second region where restoration data that should be stored even when power supply to a self device is shut off is stored, and a first flag region where a first flag is set correspondingly to the second region; a nonvolatile memory; a first writing section that writes data including the restoration data into the volatile memory; and a second writing section that writes the restoration data stored in the second region into the nonvolatile memory, wherein the first writing section sets the first flag in the first flag region corresponding to the second region where the restoration data is written, when the first flag is set in the first flag region, the second writing section writes the restoration data stored in the second region corresponding to the first flag region into the nonvolatile memory.

In the present invention, the volatile memory is provided with a flag region where a flag is set when restoration data is written into a second region. Further, when a flag is set in the flag region, a second writing section writes the restoration data stored in the second region corresponding to the flag region into the nonvolatile memory. Therefore, since a checksum is not calculated unlike a conventional manner, the restoration data can be written into the nonvolatile memory using the simple process. Further, for example, when a flag is set, information "1" whose data amount is small is stored in the flag region. For this reason, a copy of the restoration data and the checksum are not stored in the volatile memory unlike the conventional manner. As a result, the restoration data can be written into the nonvolatile memory without using the large capacity of the volatile memory.

Preferably, wherein the volatile memory further includes a third region where the restoration data to be delayed and written into the nonvolatile memory is stored, a second flag region where a second flag is set correspondingly to the third region, and a timer region for counting a time, the first writing section sets the second flag in the second flag region corresponding to the third region where the restoration data is written and starts time counting in the timer region, when the time counting in the timer region continues for over a predetermined time after the second flag is set in the second flag region, the second writing section writes the restoration data stored in the third region corresponding to the second flag region into the nonvolatile memory.

In the present invention, when counting in a timer region continues for over a predetermined time after a second flag is set in a second flag region, the second writing section writes restoration data stored in a third region corresponding to the second flag region into the nonvolatile memory. That is to say, the second writing section performs delay writing. For this reason, the number of times of writing into the nonvolatile memory is repressed, and a life of the nonvolatile memory can be lengthened.

Preferably, wherein the volatile memory further includes a third region where the restoration data to be delayed and written into the nonvolatile memory is stored, a second flag region where a second flag is set correspondingly to the third region, a third flag region where a third flag for prohibiting writing of the restoration data into the nonvolatile memory using the second writing section is set, and a timer region for counting a time, the first writing section sets the second flag in the second flag region corresponding to the third region where the restoration data is written, sets the third flag in the third flag region, and starts time counting in the timer region, when time counting in the timer region continues for over a predetermined time, deletes the third flag in the third flag region, when the second flag is set in the second flag region and the third flag is deleted in the third flag region, the second writing section writes the restoration data stored in the third region corresponding to the second flag region into the nonvolatile memory.

In the present invention, when the second flag is set in the second flag region and a third flag is deleted from a third flag region, namely, the counting in the timer region continues for over the predetermined time, the second writing section writes the restoration data stored in the third region corresponding to the second flag region into the nonvolatile memory. That is to say, the second writing section performs delay writing. For this reason, the number of times of writing into the nonvolatile memory is repressed, and a life of the nonvolatile memory can be lengthened.

Preferably, wherein the first writing section determines a region where the data is written based on an address of the volatile memory, when the determination is made that the restoration data is written into the second region, sets the first flag in the first flag region corresponding to the second region where the restoration data is written, when the determination is made that the restoration data is written into the third region, sets the flag in the second flag region corresponding to the third region where the restoration data is written, sets the third flag in the third flag region, and starts time counting in the timer region.

In the present invention, a region where data is written is determined based on an address of the volatile memory, and a flag can be set in a flag region corresponding to the region where the data is written.

DETAILED DESCRIPTION OF THE PREFERRED EMBODIMENTS

Figure 1:
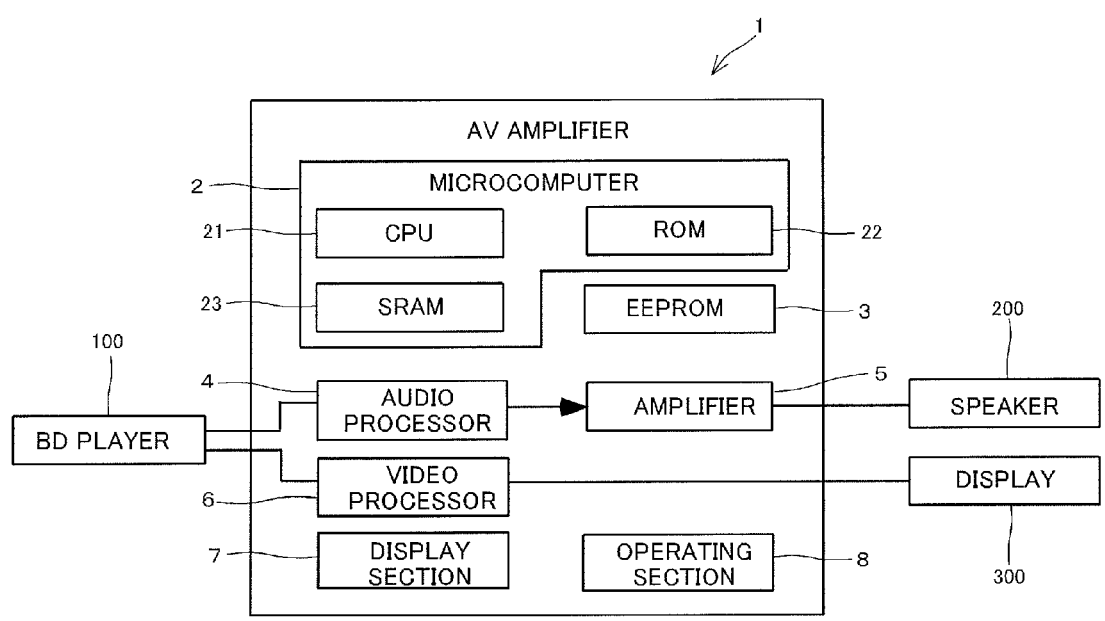
FIG. 1 is a block diagram illustrating a constitution of an AV amplifier according to an embodiment of the present invention.

An embodiment of the present invention is described below. FIG. 1 is a block diagram illustrating a constitution of an AV amplifier according to the present embodiment. An AV amplifier 1 (an electronic device) outputs an audio signal and a video signal input from, for example, a BD (Blu-ray (registered trademark) Disc) player 100 as a reproducing apparatus connected to an outside, to a speaker 200 and a display 300, respectively. As shown in FIG. 1, the AV amplifier 1 includes a microcomputer 2, an EEPROM (Electrically Erasable Programmable Read-Only Memory) 3, an audio processor 4, an amplifier 5, a video processor 6, a display section 7, an operating section 8 and the like.

The microcomputer 2 is composed of hardware such as a CPU (Central Processing Unit) 21, a ROM (Read Only Memory) 22, and an SRAM (Static Random. Access Memory) 23. The CPU 21 controls respective sections composing the AV amplifier 1 according to programs stored in the ROM 22. Further, the CPU 21 functions as an SRAM writing section 11, described later. When the CPU 21 executes various control processes, the SRAM. 23 temporarily stores a program read from the ROM 22 and data necessary for executing the various control processes in the CPU 21. The SRAM 23 is a volatile memory from which stored data is deleted when power supply is shut off. The EEPROM 3 is for storing restoration data to be stored even when the power supply to the AV amplifier 1 is shutoff. The EEPROM 3 is a nonvolatile memory for retaining stored data even at a time of no power supply.

The audio processor 4 executes audio processes such as an equalizer process, a D/A converting process, a volume adjusting process on the audio signal output from the BD player 100. The audio processor 4 outputs the audio signal subjected to the audio processes to the amplifier 5. The amplifier 5 amplifies the audio signal output from the audio processor 4. The amplifier 5 outputs the amplified audio signal to the speaker 200. The speaker 200 reproduces the audio based on the audio signal output from the AV amplifier 1.

The video processor 6 executes video processes such as an image adjusting process, a resolution converting process, and an aspect ratio converting process on the video signal output from the BD player 100. The video processor 6 outputs the video signal subjected to the video processes to the display 300. The display 300 reproduces a video based on the video signal output from the AV amplifier 1.

The display section 7 displays a setting screen, a volume level and the like, and it is an LCD (liquid crystal display), a fluorescent display or the like. The operating section 8 accepts user operations, and it is operation buttons or a remote controller provided on an enclosure of the AV amplifier 1.

Figure 2:
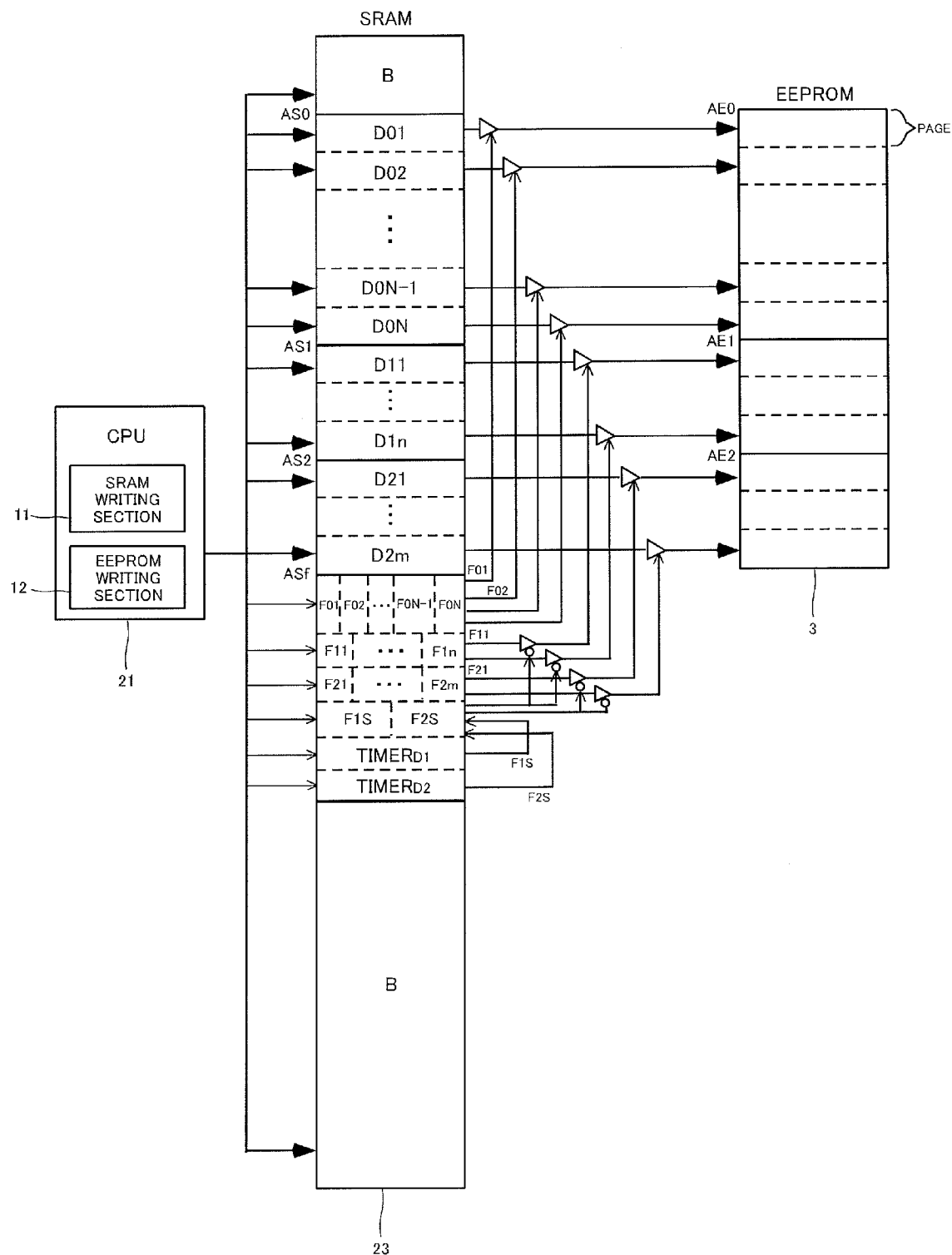
FIG. 2 is a diagram illustrating a process for writing data into an SRAM and a process for writing data into an EEPROM.

Examples of the above restoration data are information about the audio processes to be executed by the audio processor 4, and information about the video processes to be executed by the video processor 6. FIG. 2 is a diagram illustrating a process for writing data into the SRAM 23 and a process for writing data into the EEPROM 3. As shown in FIG. 2, the SRAM 23 has a region B, regions D01 to D0N, regions D11 to D1n, regions D21 to D2m, regions F01 to F0N, regions F11 to F1n, regions F21 to F2m, regions F1s and F2s, and regions $TIMER_{D1}$ and $TIMER_{D2}$. The region B (first region) is a region where data that does not have to be restored (hereinafter, referred to also as "restoration unnecessary data") is stored (hereinafter, referred to also as "restoration unnecessary region"). Further, the restoration unnecessary region B includes a region smaller than an address AS0 of the SRAM 23, and a region larger than an address ASf.

The regions D01 to D0N (second regions) are regions where restoration data is stored. Concretely, the regions D01 to D0N are delay non-writing regions (hereinafter, referred to also as "non-delay regions") where every time when restoration data is stored, namely, data stored in the regions D01 to D0N changes, the written restoration data is written also into the EEPROM 3. Further, the non-delay regions D01 to D0N are regions of the SRAM 23 at addresses AS0 to AS1.

The regions D11 to D1n (third regions) are regions where restoration data is stored. Concretely, the regions D11 to D1n are regions where delay writing is carried out in such a manner that the restoration data is written into the EEPROM 3 after a predetermined time passes from the writing of the restoration data, namely, the change in the data stored in the regions D11 to D1n (hereinafter, referred to also as "first delay area"). Further, first delay regions D11 to D1n are regions of the SRAM 23 at addresses AS1 to AS2. The regions D21 to D2m (third regions) are regions where restoration data is stored. Concretely, the regions D21 to D2m are regions where delay writing is carried out (hereinafter, referred to also as "second delay region"). Further, the second delay regions D21 to D2m are regions of the SRAM 23 at addresses AS2 to ASf. In the first delay regions D11 to D1n and the second delay regions D21 to D2m, since restoration data is frequently changed, the restoration data is written into the EEPROM 3 after some time (a few seconds) passes from the change. As a result, since the number of writing times of the restoration data into the EERPOM 3 is reduced, a life of the EEPROM 3 becomes long. A time (delay writing time) from the writing of the restoration data into the SRAM 23 to the writing of the restoration data into the EEPROM 3 is different between the first delay regions D11 to D1n and the second delay regions D21 to D2m.

The EEPROM 3 has a page unit such that 8 to 32 bytes compose one page. Since writing for one page takes the same time as writing for 1 byte, the writing is generally managed in unit of one page. Therefore, the regions D01 to D2m have a constitution corresponding to the page unit of the EEPROM 3.

The regions F01 to F0N (first flag regions) are non-delay updating request flag regions where an updating request flag (first flag) in the non-delay region is set correspondingly to the non-delay regions D01 to D0N. "Setting a flag" is changing a value of the flag region from "0" into "1". On the contrary, "deleting a flag" is changing a value of the flag region from "1" into "0". Therefore, when a flag is set, "1" is stored in the flag region. The regions F11 to F1n (second flag regions) are first delay updating request flag regions where an updating request flag (second flag) in the first delay region is set correspondingly to the first delay regions D11 to D1n. The regions F21 to F2m (second flag regions) are second delay updating request flag regions where an updating request flag (second flag) in the second delay region is set correspondingly to the second delay regions D21 to D2m.

Regions F1S and F2S (third flag regions) are updating repression flag regions where an updating repression flag (third flag) for prohibiting restoration data from being written into the EEPROM 3 using an EEPROM writing section 12, described later. The region F1S is a first delay updating repression flag region corresponding to the first delay regions D11 to D1n. The region F2S is a second delay updating repression flag region corresponding to the second delay regions D21 to D2m. The regions $TIMER_{D1}$ and $TIMER_{D2}$ are timer regions where a time is counted. Concretely, the regions $TIMER_{D1}$ and $TIMER_{D2}$ are regions where a time value that is counted up by the SRAM writing section 11, described later, is stored. Further, a maximum timer value that can be counted up is set to a predetermined time in the regions $TIMER_{D1}$ and $TIMER_{D2}$, and when the timer value reaches the maximum timer value, overflow occurs. The region $TIMER_{D2}$ is a first timer region corresponding to the first delay regions D11 to D1n. The maximum timer value of the first timer region $TIMER_{D2}$ is set to a delay writing time in the first delay regions D11 to D1n. The region $TIMER_{D2}$ is a second timer region corresponding to the second delay regions D21 to D2m. The maximum timer value of the second timer region $TIMER_{D2}$ is set to a delay writing time of the second delay regions D21 to D2m.

A process to be executed by the CPU 21 is described below. The CPU 21 functions as the SRAM writing section 11 and the EEPROM writing section 12. The SRAM writing section 11 (first writing section) writes data in the SRAM 23. Concretely, the SRAM writing section 11 writes restoration unnecessary data in the restoration unnecessary region B based on an address of the SRAM 23 as a writing destination. Further, the SRAM writing section 11 writes restoration data in the regions D01 to D2m.

Further, the SRAM writing section 11 determines a region where data is written based on an address of the SRAM 23. Concretely, when the SRAM writing section 11 writes data in a region smaller than the address AS0 of the SRAM 23 or a region larger than the address ASf, it determines that restoration unnecessary data is written in the restoration unnecessary region B. Further, when the SRAM writing section 11 writes data in the regions of the SRAM 23 at the addresses AS0 to AS1, it determines that restoration data is written in the non-delay regions D01 to D0N. Further, when the SRAM writing section 11 writes data in the regions of the SRAM 23 at the addresses AS1 to AS2, it determines that restoration data is written in the first delay regions D11 to D1n. Further, when the SRAM writing section 11 writes data in the regions of the SRAM 23 at the addresses AS2 to ASf, it determines that restoration data is written in the second delay regions D21 to D2m.

Further, the SRAM writing section 11 sets flags in the flag regions F01 to F2m, F1S, and F2S, and deletes the flags. That is to say, the SRAM writing section 11 changes values of the flag regions F01 to F2m, F1S and F2S from "0" into "1" so as to set the flags, and changes the values of the flag regions F01 to F2m, F1S and F2S from "1" into "0" so as to delete the flags. Concretely, when the SRAM writing section 11 determines that restoration data is written in the non-delay regions D01 to D0N, it sets updating request flags in the non-delay updating request flag regions F01 to F0N, respectively, corresponding to the non-delay regions D01 to D0N where the restoration data is written.

Figure 3:
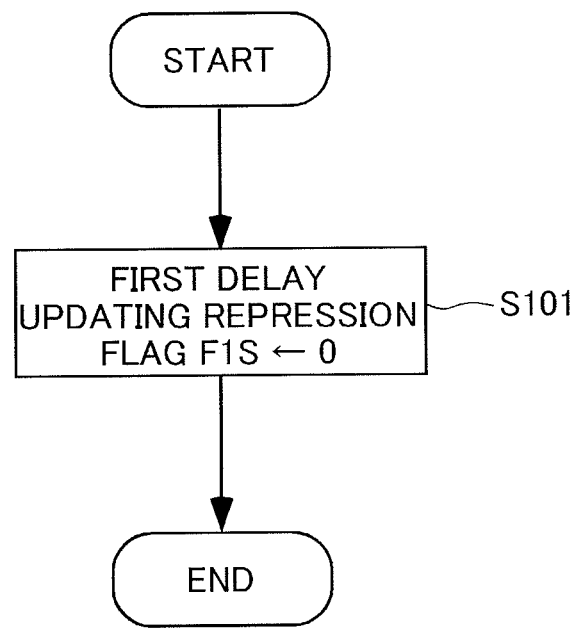
FIG. 3 is a flowchart illustrating a process for deleting an updating repression flag in a first delay updating repression flag region.

Further, when the SRAM writing section 11 determines that the restoration data is written in the first delay regions D11 to D1n, it sets the updating request flags in first delay updating request flag regions F11 to F1n, respectively, corresponding to the first delay regions D11 to D1n where the restoration data is written. At this time, the SRAM writing section 11 sets the updating repression flag in a first delay updating repression flag region F1s. Further, the SRAM writing section 11 starts time counting in the first timer region $TIMER_{D1}$. When counting in the first timer region $TIMER_{D1}$ continues for over a predetermined time and overflow occurs, the SRAM writing section 11 deletes the updating repression flag in the first delay updating repression flag region F1S. As shown in FIG. 3, the SRAM writing section 11 sets the value of the first delay updating repression flag region F1S to 0 (S101).

Figure 4:
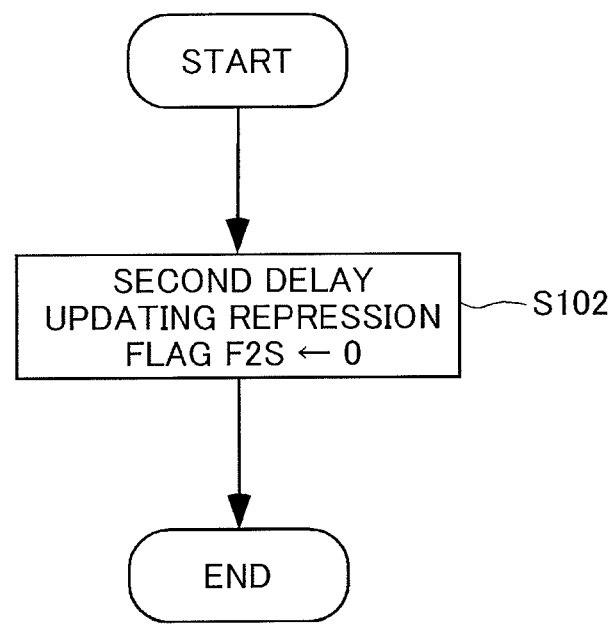
FIG. 4 is a flowchart illustrating a process for deleting an updating repression flag in a second delay updating repression flag region.

Further, when the SRAM writing section 11 determines that the restoration data is written in the second delay regions D21 to D2m, it sets the updating request flags in second delay updating request flag regions F21 to F2m, respectively, corresponding to the second delay regions D21 to D2m where the restoration data is written. At this time, the SRAM writing section 11 sets the updating repression flag in a second delay updating repression flag region F2S. Further, the SRAM writing section 11 starts the time counting in the second timer region $TIMER_{D2}$. When the counting in the second timer region $TIMER_{D2}$ continues for over the predetermined time and overflow occurs, the SRAM writing section 11 deletes the updating repression flag in the second delay updating repression flag region F2S. As shown in FIG. 4, the SRAM writing section 11 sets the value of the second delay updating repression flag region F2S to 0 (S102).

The setting of a flag in the SRAM 23 by the SRAM writing section 11 and the time counting using the SRAM 23 (storage of the counted-up timer value) are also processes to be executed by writing data in the SRAM 23.

The EEPROM writing section 12 (second writing section) writes restoration data into the EEPROM 3. Concretely, when the updating request flags are set in the non-delay updating request flag regions F01 to F0N, the EEPROM writing section 12 writes the restoration data stored in the non-delay regions D01 to D0N corresponding to the non-delay updating request flag regions F01 to F0N into the EEPROM 3. Further, when the updating request flags are set in the first delay updating request flag regions F11 to F1n, and the updating repression flag in the first delay updating repression flag region F1S is deleted, the EEPROM writing section 12 writes the restoration data stored in the first delay regions D11 to D1n corresponding to the first delay updating request flag regions F11 to F1n into the EEPROM 3. Further, when the updating request flags are set in the second delay updating request flag regions F21 to F2m, and the updating repression flag in the second delay updating repression flag region F2S is deleted, the EEPROM writing section 12 writes the restoration data stored in the second delay regions D21 to D2m corresponding to the second delay updating request flag regions F21 to F2m into the EEPROM 3.

The non-delay regions D01 to D0N of the SRAM 23 at the addresses AS0 to AS1 are related to regions of the EEPROM 3 at addresses AE0 to AE1, and the EEPROM writing section 12 writes the restoration data stored in the non-delay regions D01 to D0N into the regions of the EEPROM 3 at the addresses AE0 to AE1. Further, the first delay regions D11 to D1n of the SRAM 23 at the addresses AS1 to AS2 are related to regions of the EEPROM 3 at addresses AE1 to AE2, and the EEPROM writing section 12 writes the restoration data stored in the first delay regions D11 to D1n into the regions of the EEPROM 3 at the addresses AE1 to AE2. Further, the second delay regions D21 to D2m of the SRAM 23 at the addresses AS2 to ASf are related to regions of the EEPROM 3 at addresses AE2 to AEf, and the EEPROM writing section 12 writes the restoration data stored in the second delay regions D21 to D2m into the regions of the EEPROM 3 at the addresses AE1 to AE2.

Figure 5:
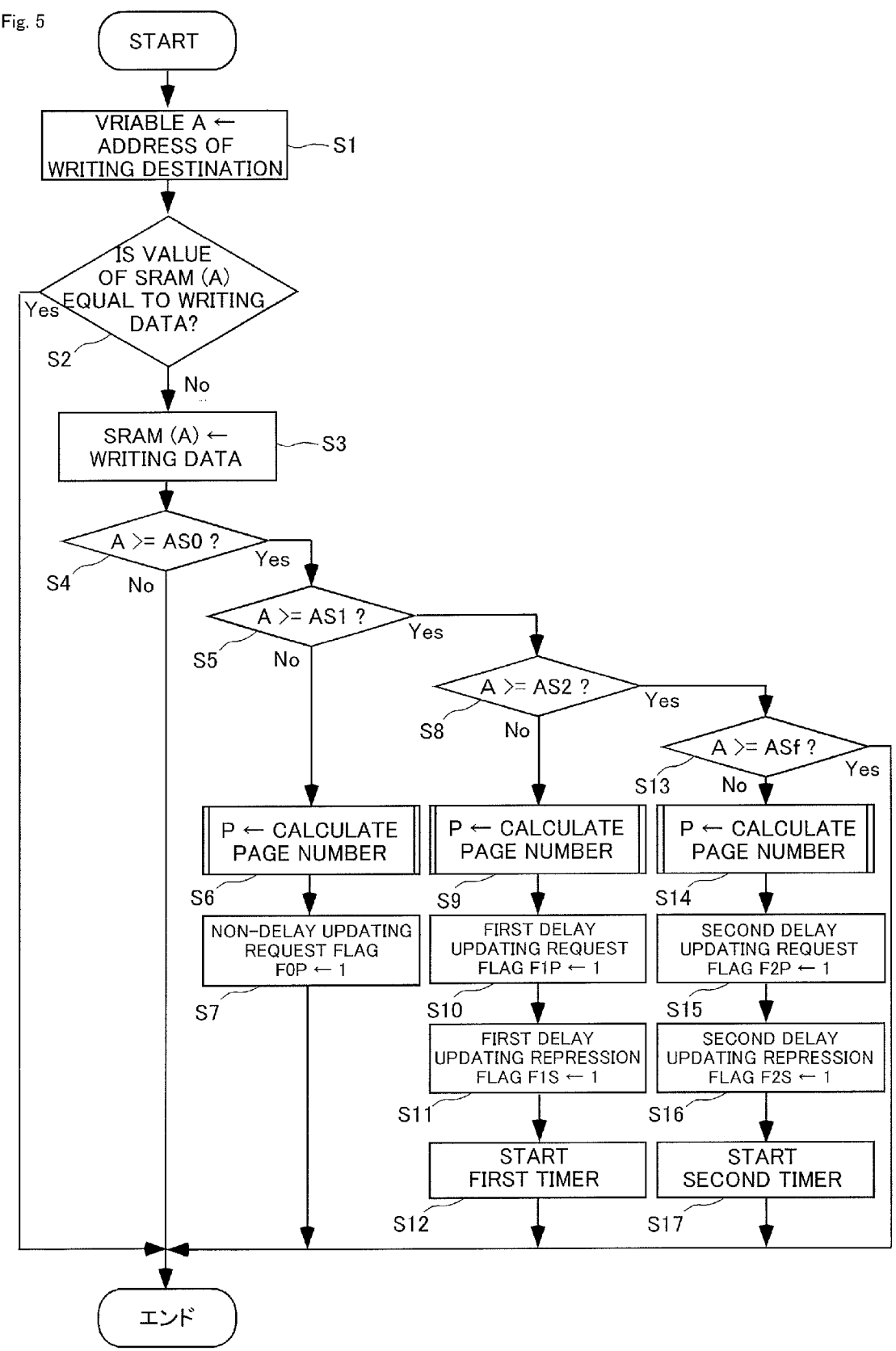
FIG. 5 is a flowchart illustrating a process for writing data into an SRAM.

A process for writing data into the SRAM 23 is described below with reference to the flowchart shown in FIG. 5. When, for example, the process for writing into the SRAM. 23 according to an application program is generated, the CPU 21 (the SRAM writing section 11) executes the following process. In this embodiment, since data is written into the SRAM 23 by a software process in the CPU 21, the following process is incorporated as API of OS, library and middleware.

The SRAM writing section 11 first sets a variable A corresponding to the address of the SRAM 23 as an address of a writing destination (S1). The SRAM writing section 11 determines whether a value of the SRAM 23 at the address (variable) A is equal to data to be written into the SRAM 23 (S2). That is to say, the SRAM writing section 11 determines whether data stored in the address A of the SRAM 23 is the same as data to be written in the SRAM 23. When the SRAM writing section 11 determines that the value of the SRAM 23 at the addresses A is equal to the data to be written into the SRAM 23 (S2: Yes), the process is ended. Since the data stored in the address A of the SRAM 23 is equal to the data to be written into the SRAM 23, namely, the data to be stored in the address A of the SRAM 23 does not change, data does not have to be written.

When the SRAM writing section 11 determines that the value of the SRAM 23 at the address A is not equal to the data to be written into the SRAM 23 (S2: No), it sets the value of the SRAM 23 at the address A as writing data (S3). That is to say, the SRAM writing section 11 writes the data into the region corresponding to the address A of the SRAM 23.

The SRAM writing section 11 then determines whether the variable A corresponding to the address of the SRAM 23 where the data is written is the address AS0 or more (S4). When the SRAM writing section 11 determines that the variable A is not the address AS0 or more (A<AS0), namely, restoration unnecessary data is written in the restoration unnecessary region B (S4: No), the process is ended. Since the SRAM writing section 11 writes the restoration unnecessary data into the restoration unnecessary region B, the process for writing data into the EEPROM 3 does not have to be executed.

When the SRAM writing section 11 determines that the variable A is the address AS0 or more (S4: Yes), it determines whether the variable A is the address AS1 or more (S5). When the SRAM writing section 11 determines that the variable A is not the address AS1 or more (AS0≤A<AS1), namely, restoration data is written into the non-delay regions D01 to D0N (S5: No), it calculates a page number corresponding to the variable (address) A, and sets a variable P corresponding to the page number as the calculated page number (S6). The SRAM writing section 11 sets a value of a non-delay updating request flag region F0P to 1 (S7). That is to say, the SRAM writing section 11 sets a flag in the non-delay updating request flag region F0P. For example, when the calculated page number is 2, restoration data is written into a page D02 (P=2) of the non-delay region, and a flag is set in the non-delay updating request flag region F02 (P=2). In such a manner, the SRAM writing section 11 sets the updating request flags in the non-delay updating request flag regions F01 to F0N, respectively, corresponding to the non-delay regions D01 to D0N where the restoration data is written.

When the SRAM writing section 11 determines that the variable A is the address AS1 or more (S5: Yes), it determines whether the variable A is the address AS2 or more (S8). When the SRAM writing section 11 determines that the variable A is not the address AS2 or more (AS1≤A<AS2), namely, the restoration data is written into the first delay regions D11 to D1n (S8: No), it calculates a page number corresponding to the variable (address) A, and sets the variable P corresponding to the page number as the calculated page number (S9). The SRAM writing section 11 sets a value of a first delay updating request flag region F1P to 1 (S10). That is to say, the SRAM writing section 11 sets a flag in the first delay updating request flag region F1P. The SRAM writing section 11 then sets a value of the first delay updating repression flag region F1S to 1 (S11). That is to say, the SRAM writing section 11 sets a flag in the first delay updating repression flag region F1S. The SRAM writing section 11 starts the time counting in the first timer region $TIMER_{D1}$ (S12).

When the SRAM writing section 11 determines that the variable A is the address AS2 or more (S8: Yes), it determines whether the variable A is the address ASf or more (S13). When the SRAM writing section 11 determines that the variable A is not the address ASf or more, namely, the restoration data is written into the second delay regions D21 to D2m (S13: No), it calculates a page number corresponding to the variable (address) A, and sets the variable P corresponding to the page number as the calculated page number (S14). The SRAM writing section 11 sets a value of a second delay updating request flag region F2P to 1 (S15). That is to say, the SRAM writing section 11 sets a flag in the second delay updating request flag region F2P. The SRAM writing section 11 then sets a value of the second delay updating repression flag region F2S to 1 (S16). That is to say, the SRAM writing section 11 sets a flag in the second delay updating repression flag region F2S. The SRAM writing section 11 starts the time counting in the second timer region $TIMER_{D2}$. When the SRAM writing section 11 determines that the variable A is the address ASf or more, namely, restoration unnecessary data is written into the restoration unnecessary region B (S13: Yes), the process is ended.

Figure 6:
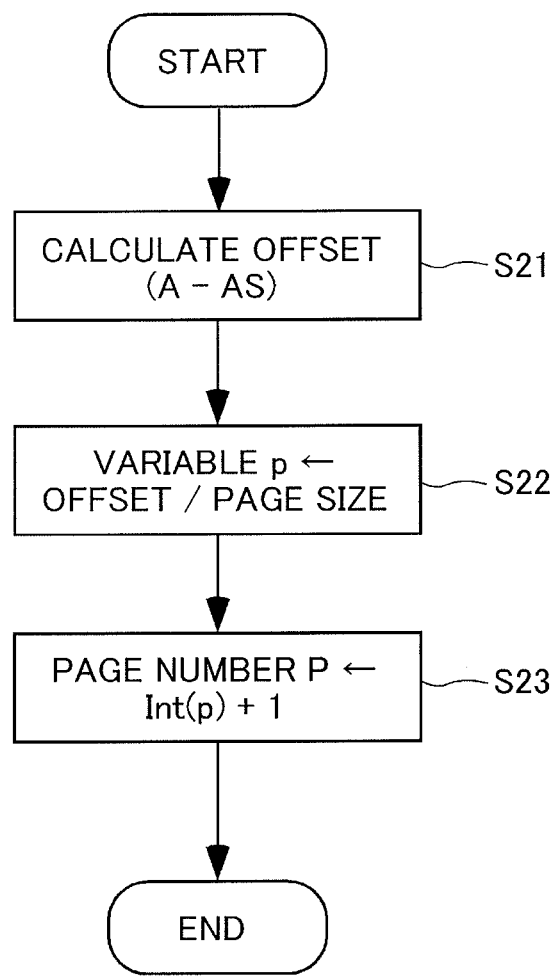
FIG. 6 is a flowchart illustrating a page number calculating process.

The process for calculating a page number (S6, S9, and S14 in FIG. 5) is described below with reference to the flowchart shown in FIG. 6. The SRAM writing section 11 first calculates offset (S21). When the restoration data is written in the non-delay regions D01 to D0N (S6), the SRAM writing section 11 calculates A-AS0. Further, when the restoration data is written into the first delay regions D11 to D1n (S9), the SRAM writing section 11 calculates A-AS1. Further, when the restoration data is written into the second delay regions D21 to D2m (S14), the SRAM writing section 11 calculates A-AS2. The SRAM writing section 11 divides the calculated offset by a page size of one page, and sets the divided value as the variable p (S22). For example, when the offset is 50 bytes and the page size is 32, 50/32 (=1.5625) is calculated. The number obtained by adding 1 to an integer part of the variable p is set as the page number P (S23). For example, when the variable p=50/32 (=1.5625), 1+1=2 is set as the page number P. In this example, restoration data is written in page 2 (for example, a page D02 in the non-delay region). A function Int(p) shown in FIG. 6 is an arithmetic function that returns an integer part of p.

Figure 7:
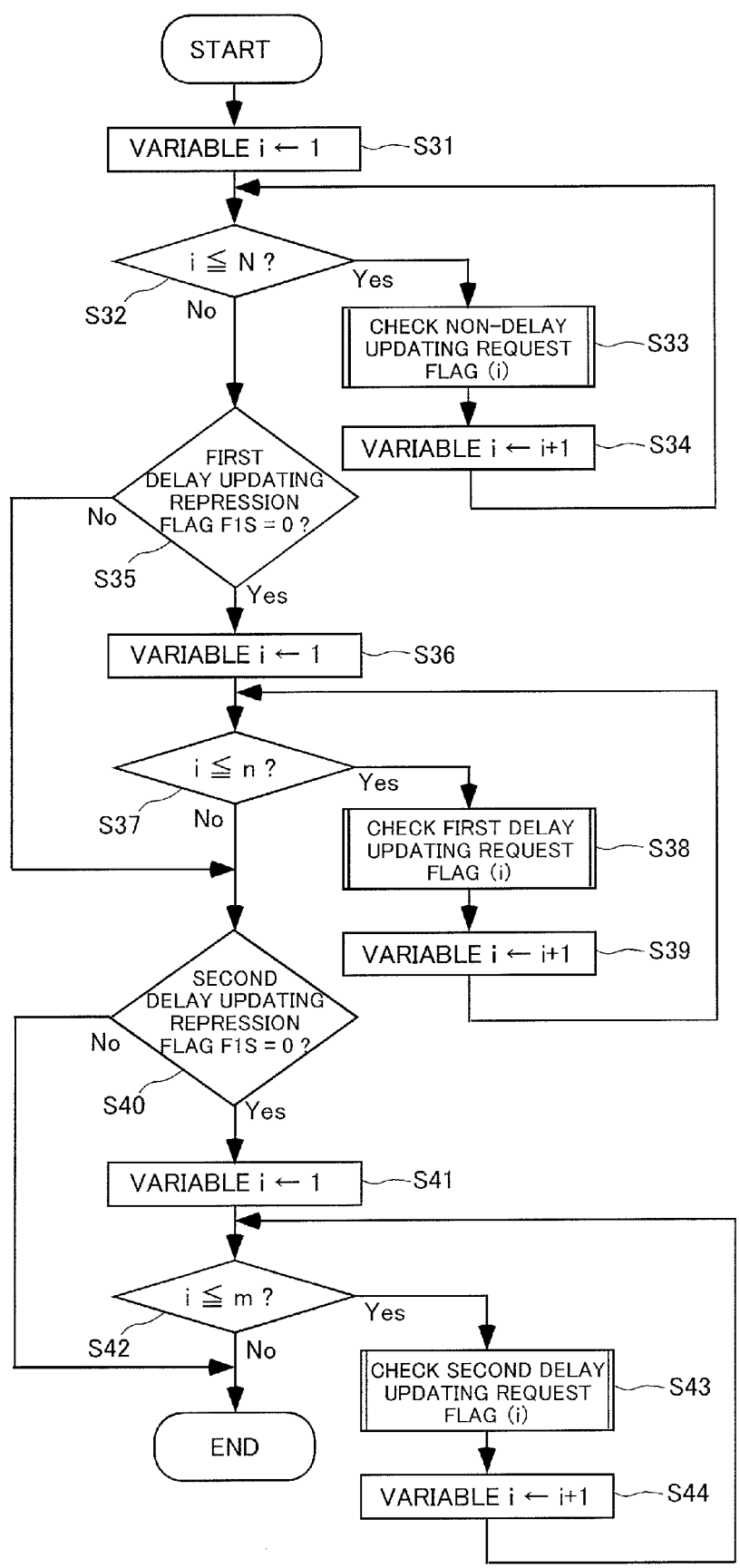
FIG. 7 is a flowchart illustrating a process for writing restoration data into the EEPROM.

The process for writing restoration data into the EEPROM 3 is described based on a flowchart shown in FIG. 7. The following process is executed by the CPU 21 (the EEPROM writing section 12) periodically (1 to a few seconds) as a task different from the processes shown in FIG. 5 and FIG. 6. The EEPROM writing section 12 sets a variable i corresponding to the page number to 1 (S31). The EEPROM writing section 12 determines whether the variable i corresponding to the page number is the number of pages N or less in the non-delay regions D01 to D0N (S32). When the EEPROM writing section 12 determines that the variable i is the number of pages N or less in the non-delay regions D01 to D0N (S32: Yes), it checks the non-delay updating request flag region F0i (S33). The EEPROM writing section 12 sets the variables i to i+1 (S34). This is because a determination is made whether a next page number is the number of pages N or less in D01 to D0N at the next step S32. Further, this is because, the non-delay updating request flag region F0i corresponding to the next page number is checked at the next step S33.

While the determination is made that the variable i is the number of pages N or less (S32: Yes), the EEPROM writing section 12 repeats steps S33 and S34. When the EEPROM writing section 12 determines that the variable i is not the number of pages N or less in the non-delay regions D01 to D0N (S32: No), it checks all the non-delay updating request flag regions F01 to F0N. For this reason, the EEPROM writing section 12 determines whether the value of the first delay updating repression flag region F1S is 0 (S35). That is to say, the EEPROM writing section 12 determines whether a flag is set in the first delay updating repression flag region F1S. When the EEPROM writing section 12 determines that a value of the first delay region updating repression flag region F1S is 0, namely, a flag is not set in the first delay updating repression flag region F1S (S35: Yes), it sets the variable i corresponding to the page number to 1 (S36). The EEPROM writing section 12 determines whether the variable i corresponding to the page number is the number of pages n or less in the first delay regions D11 to D1n (S37). When the EEPROM writing section 12 determines that the variable i is the number of pages n or less in the first delay regions D11 to D1n (S37: Yes), it checks a first delay updating request flag region F1i (S38). The EEPROM writing section 12 sets the variables i to i+1 (S39).

While the EEPROM writing section 12 determines that the variable i is the number of pages n or less (S37: Yes), it repeats the steps S38 and S39. When the EEPROM writing section 12 determines that the variable i is not the number of pages n or less in the first delay regions D11 to D1n (S37: No), it checks all the first delay updating request flag regions F11 to F1n. For this reason, the EEPROM writing section 12 determines whether the value of the second delay updating repression flag region F2S is 0 (S40). That is to say, the EEPROM writing section 12 determines whether a flag is set in the second delay updating repression flag region F2S. Further, when the EEPROM writing section 12 determines that the value of the first delay region updating repression flag region F1S is not 0, namely, a flag is set in the first delay updating repression flag region F1S (S35: No), it executes a step S40 without executing steps S37 to S39. That is to say, since a flag is set in the first delay updating repression flag region F1S, the EEPROM writing section 12 does not check the first delay updating request flag regions F11 to F1n.

When the EEPROM writing section 12 determines that a value of a second delay updating repression flag region F1S is 0, namely, a flag is not set in the second delay updating repression flag region F1S (S40: Yes), it sets the variable i corresponding to the page number to 1 (S41). The EEPROM writing section 12 determines whether the variable i corresponding to the page number is a page number m or less in the second delay regions D21 to D2m (S42). When the EEPROM writing section 12 determines that the variable i is the number of pages m or less in the second delay regions D21 to D2m (S42: Yes), it checks a second delay updating request flag region F2i (S43). The EEPROM writing section 12 sets the variables i to i+1 (S44).

While the EEPROM writing section 12 determines that the variable i is the number of pages m or less (S42: Yes), it repeats steps S43 and S44. When the EEPROM writing section 12 determines that the variable i is not the number of pages m or less in the first delay regions D21 to D2m (S42: No), it checks all the second delay updating request flag regions F21 to F2m. For this reason, the process is ended. Further, when the EEPROM writing section 12 determines that a value of a second delay updating repression flag region F2S is not 0, namely, a flag is set in the second delay updating repression flag region F2S (S40: No), it executes the step S40 without executing the steps S42 to S44. That is to say, since a flag is set in the second delay updating repression flag region F2S, the EEPROM writing section 12 does not check the second delay updating request flag regions F21 to F2m.

Figure 8:
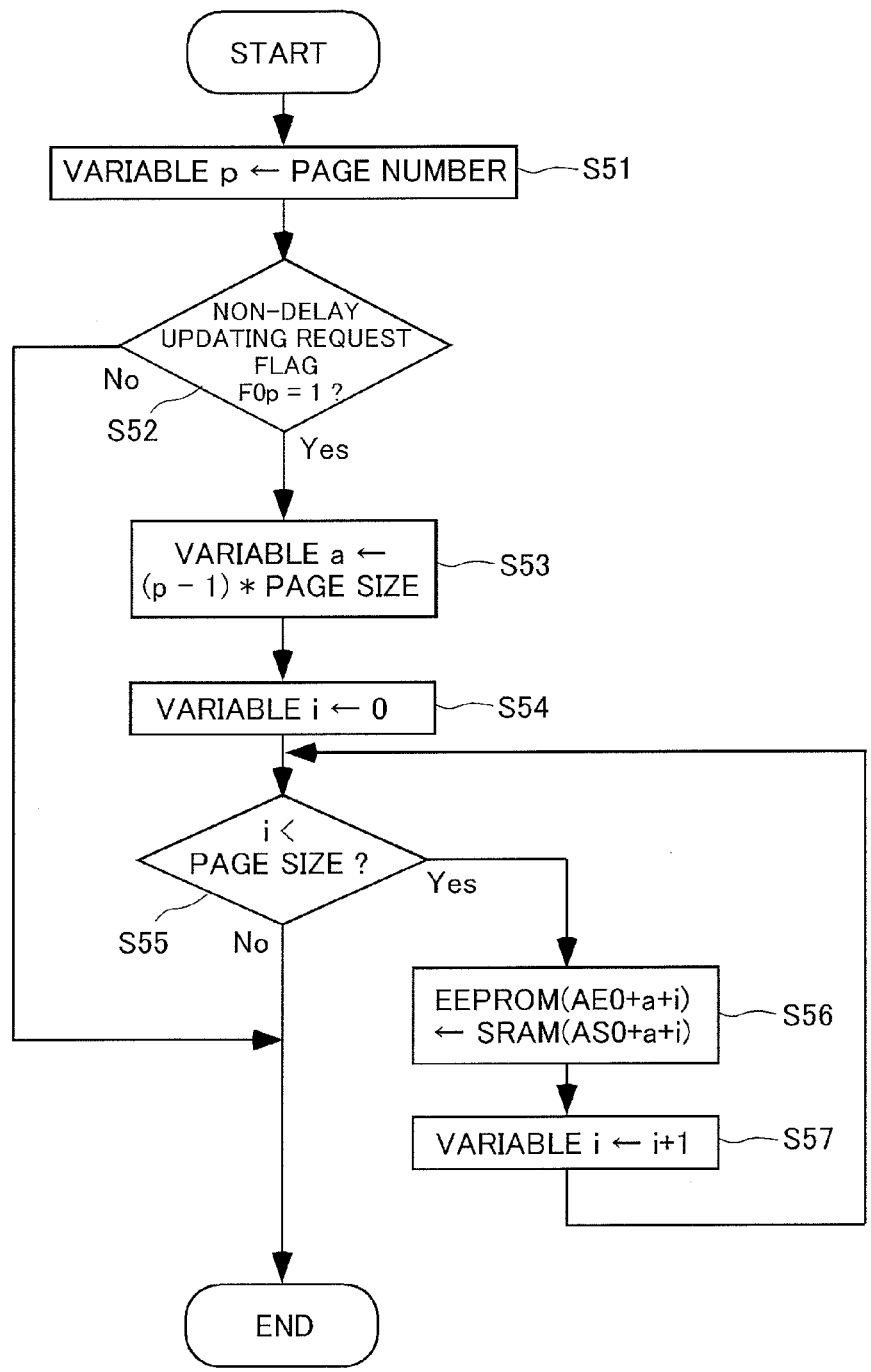
FIG. 8 is a flowchart illustrating a process for checking a non-delay updating request flag region.

The process for checking the non-delay updating request flag regions F01 to F0N (S33 in FIG. 7) is described with reference to a flowchart shown in FIG. 8. The EEPROM writing section 12 sets the variable p as the page number (i at S33 of FIG. 7) (S51). The EEPROM writing section 12 determines whether the value of the non-delay updating request flag region F0p is (S52). That is to say, the EEPROM writing section 12 determines whether a flag is set in the non-delay updating request flag region F0p. When the EEPROM writing section 12 determines that the value of the non-delay updating request flag region F0p is not 1, namely, a flag is not set in the non-delay updating request flag region F0p (S52: No), it does not have to write the restoration data stored in the non-delay region D0p into the EEPROM 3. For this reason, the process is ended.

When the EEPROM writing section 12 determines that the value of the non-delay updating request flag region F0p is 1, namely, a flag is set in the non-delay updating request flag region F0p (S52: Yes), it sets the number obtained by multiplying the number obtained by subtracting 1 from the variable p corresponding to the page number by the page size as a variable a (S53). The variable a corresponds to the number of bytes from the address AS0 of the SRAM 23 to a page number (p−1). For example, when the page number is 3 and the page size is 32 bytes, the number of bytes up to the page number 2 is 64 bytes. The EEPROM writing section 12 sets the variable i corresponding to the number of bytes to 0 (S54). The EEPROM writing section 12 determines whether the variable i corresponding to the number of bytes is smaller than the page size (S55). When the EEPROM writing section 12 determines that the variable i is smaller than the page size (S55: Yes), it sets a value of the EEPROM 3 at the address AE0+a+i as a value of the SRAM 23 at the address AS0+a+i (S56). That is to say, the EEPROM writing section 12 writes restoration data stored in the region of the SRAM 23 at the address AS0+a+i into a region of the EEPROM 3 at the address AE0+a+i. For example, when the page number is 3 and the page size is 32 bytes in the first process, a value of the EEPROM 3 at the address AE0+64+0 is a value of the SRAM 23 at an address AS0+64+0. The EEPROM writing section 12 then sets the variables i to i+1 (S57).

While the EEPROM writing section 12 determines that the variable i is smaller than the page size (S55: Yes), it repeats the steps S55 to S57. Since the variable i increases one by one, for example, when the page number is 3 and the page size is 32 bytes, a value of the EEPROM 3 at an address AE0+64+(0 to 32) is a value of the SRAM 23 at an address AS0+64+(0 to 32). That is to say, the restoration data stored in the non-delay region D03 for one page of the page number 3 is written into the EEPROM 3.

When the EEPROM writing section 12 determines that the variable i is not smaller than the page size (S55: No), the process is ended. In such a manner, the EEPROM writing section 12 writes the restoration data for one page stored in the non-delay region D0$p$ into the EEPROM 3.

Figure 9:
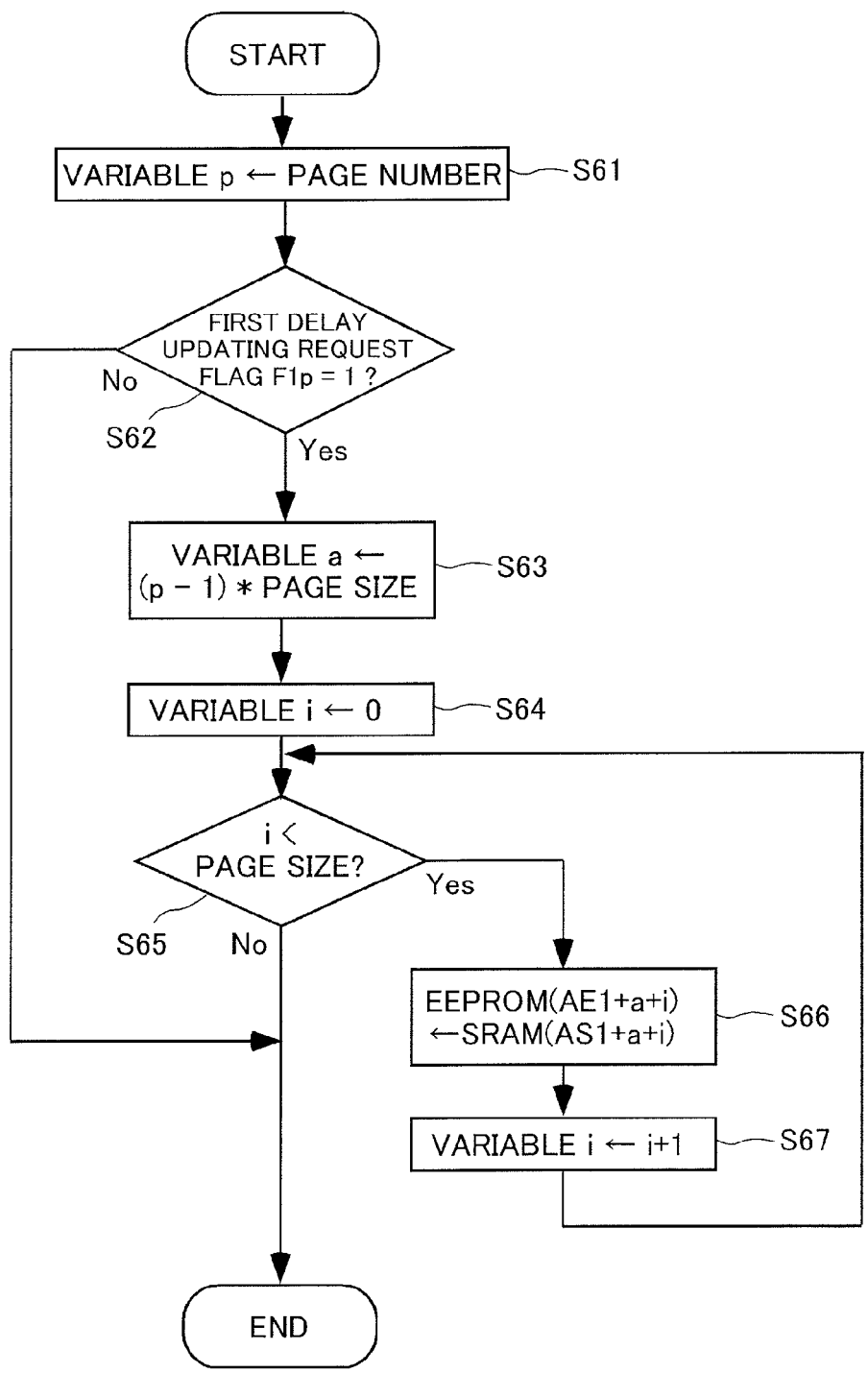
FIG. 9 is a flowchart illustrating a process for checking a first delay updating request flag region.

The process for checking the first delay updating request flag regions F11 to F1$n$ (S38 in FIG. 7) is described below with reference to a flowchart shown in FIG. 9. The EEPROM writing section 12 sets the variable p as the page number (i at S38 in FIG. 7) (S61). The EEPROM writing section 12 then determines whether a value of a first delay updating request flag region F1$p$ is 1 (S62). That is to say, the EEPROM writing section 12 determines whether a flag is set in the first delay updating request flag region F1$p$. When the EEPROM writing section 12 determines that the value of the first delay updating request flag region F1$p$ is not 1, namely, a flag is not set in the first delay updating request flag region F1$p$ (S62: No), it does not have to write the restoration data stored in the first delay region Di$p$ into the EEPROM 3. For this reason, the process is ended.

When the EEPROM writing section 12 determines that the value of the first delay updating request flag region F1$p$ is 1, namely, a flag is set in the first delay updating request flag region F1$p$ (S62: Yes), it sets the number obtained by multiplying the number obtained by subtracting 1 from the variable p corresponding to the page number by the page size as the variable a (S63). The EEPROM writing section 12 then sets the variable i corresponding to the number of bytes to 0 (S64). The EEPROM writing section 12 then determines whether the variable i corresponding to the number of bytes is smaller than the page size (S65). When the EEPROM writing section 12 determines that the variable i is smaller than the page size (S65: Yes), it sets a value of the EEPROM 3 at an address AE1+a+i as a value of the SRAM. 23 at an address AS1+a+i (S66). That is to say, the EEPROM writing section 12 writes restoration data stored in the region of the SRAM 23 at the address AS1+a+i into a region of the EEPROM 3 at the address AE1+a+i. The EEPROM writing section 12 then sets the variable i to i+1 (S67). While the EEPROM writing section 12 determines that the variable i is smaller than the page size (S65: Yes), it repeats the steps S65 to S67. When the EEPROM writing section 12 determines that the variable i is not smaller than the page size (S65: No), the process is ended. In such a manner, the EEPROM writing section 12 writes the restoration data for one page stored in the first delay region Di$p$ into the EEPROM 3.

Figure 10:
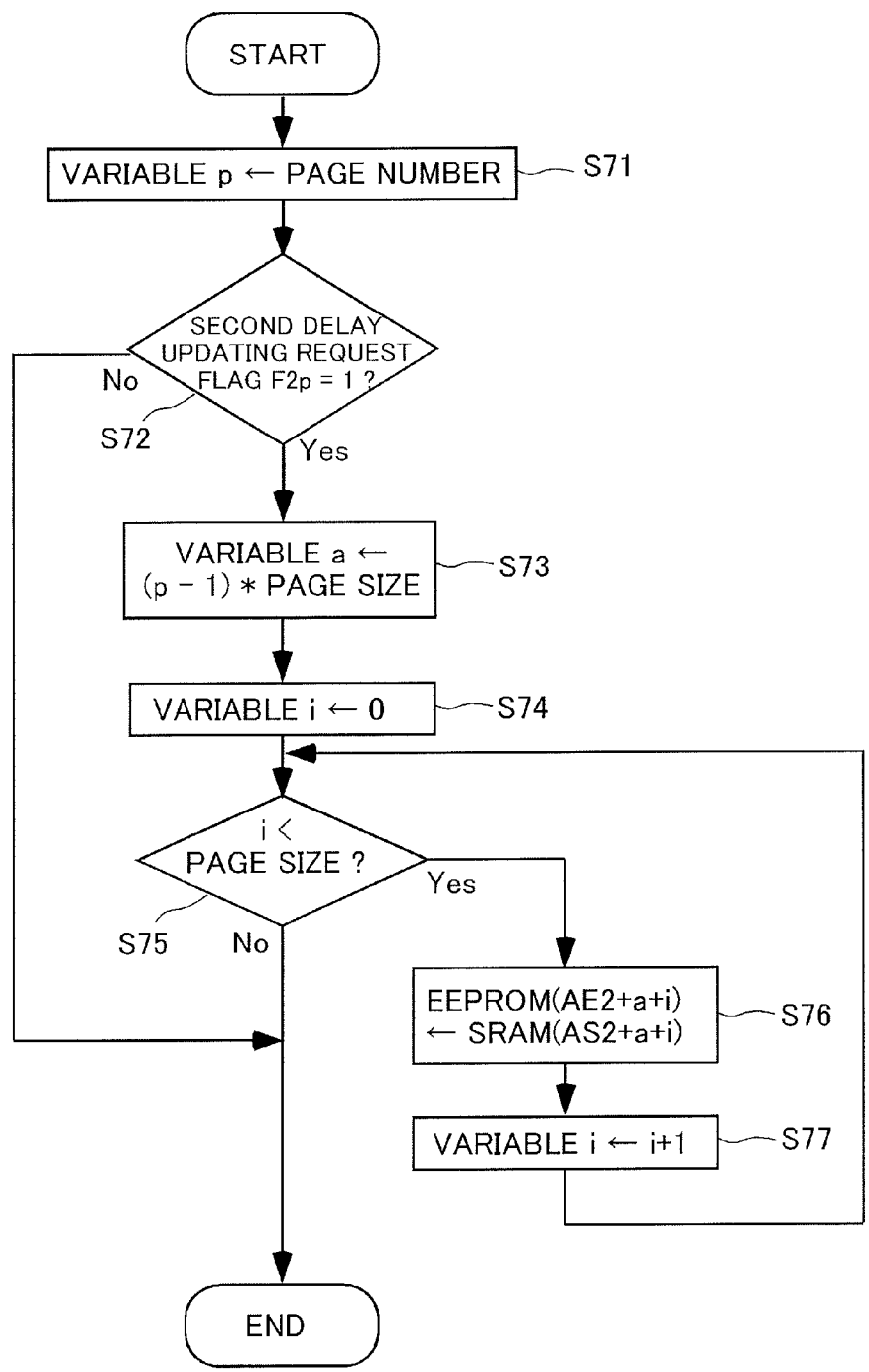
FIG. 10 is a flowchart illustrating a process for checking a second delay updating request flag region.

The process for checking the second delay updating request flag regions F21 to F2$m$ (S43 in FIG. 7) is described below with reference to a flowchart shown in FIG. 10. The EEPROM writing section 12 sets the variable p as the page number (i at S43 in FIG. 7) (S71). The EEPROM writing section 12 then determines whether a value of a second delay updating request flag region F2$p$ is 1 (S72). That is to say, the EEPROM writing section 12 determines whether a flag is set in the second delay updating request flag region F2$p$. When the EEPROM writing section 12 determines that the value of the second delay updating request flag region F2$p$ is not 1, namely, a flag is not set in the second delay updating request flag region F2$p$ (S72: No), it does not have to write restoration data stored in a second delay region D2$p$ into the EEPROM 3. For this reason, the process is ended.

When the EEPROM writing section 12 determines that the value of the second delay updating request flag region F2$p$ is 1, namely, a flag is set in the second delay updating request flag region F2$p$ (S72: Yes), it sets a number obtained by multiplying a number obtained by subtracting 1 from the variable p corresponding to the page number by the page size, as the variable a (S73). The EEPROM writing section 12 then sets the variable i corresponding to the number of bytes to 0 (S74). The EEPROM writing section 12 then determines whether the variable i corresponding to the number of bytes is smaller than the page size (S75). When the EEPROM writing section 12 determines that the variable i is smaller than the page size (S75: Yes), it sets a value of the EEPROM 3 at an address AE2+a+i as a value of the SRAM 23 at an address AS2+a+i (S76). That is to say, the EEPROM writing section 12 writes restoration data stored in the region of the SRAM 23 at the address AS2+a+i into the region of the EEPROM 3 at the address AE2+a+i. The EEPROM writing section 12 then sets the variable i to i+1 (S77). While the EEPROM writing section 12 determines that the variable i is smaller than the page size (S75: Yes), it repeats the steps S75 to S77. When the EEPROM writing section 12 determines that that the variable i is not smaller than the page size (S76: No), the process is ended. In such a manner, the EEPROM writing section 12 writes the restoration data for one page stored in the second delay region D2$p$ into the EEPROM 3.

This embodiment is compared with a conventional technique.

For example, the EEPROM is constituted as follows.

Capacity: 8192 bytes

Page size (the number of bytes for one page): 32 bytes

The number of pages: 256 pages (=8192/32)

An SRAM includes a non-delay region, a first delay region, a second delay region, a first timer region, and a second timer region. One timer region requires 4 bytes.

Figure 11:
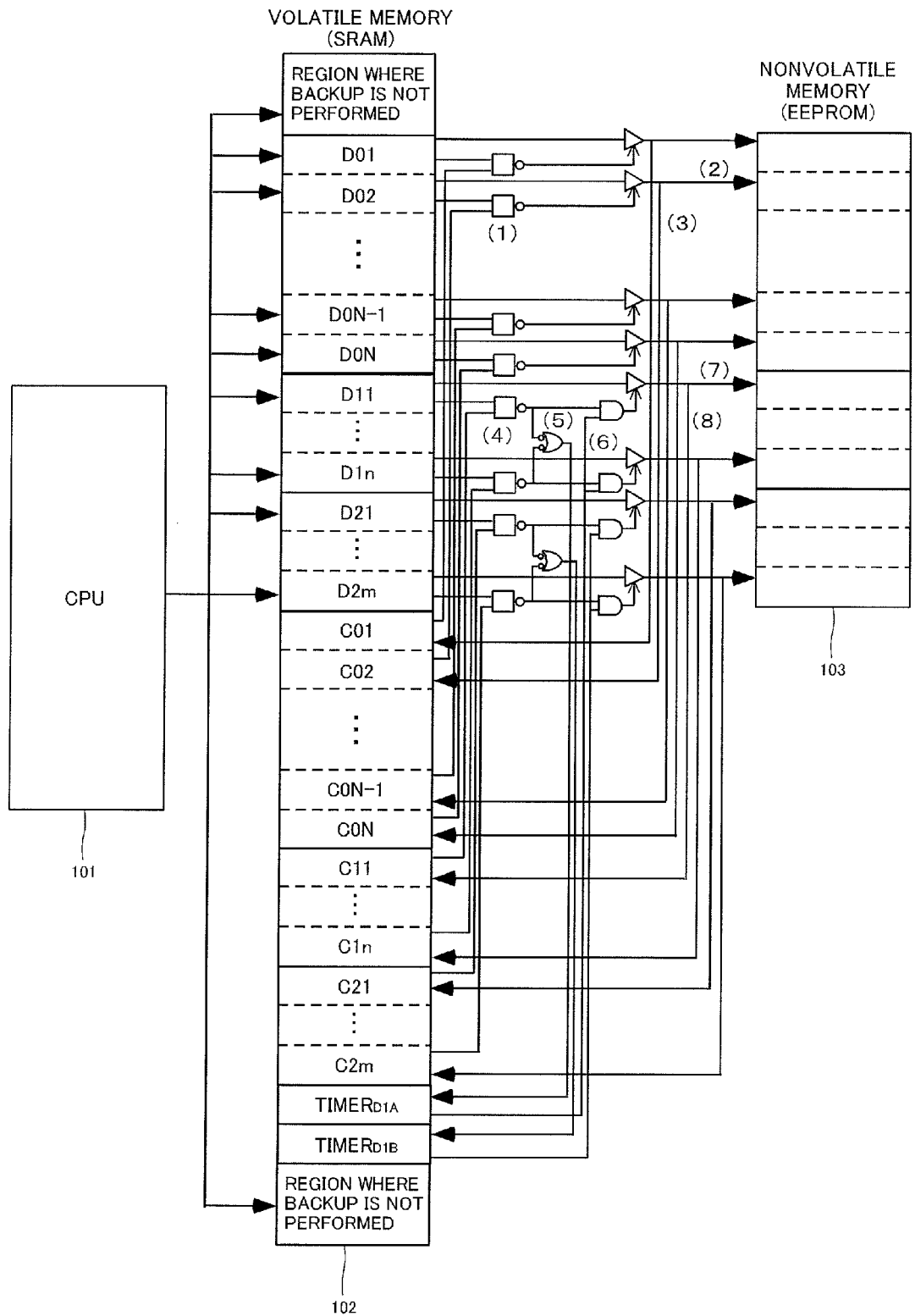
FIG. 11 is a diagram illustrating a conventional process for writing data into a volatile memory, and a process for writing data into a nonvolatile memory.

In the case of the conventional technique shown in FIG. 11, a region where restoration data is copied requires 8192 bytes. Further, two timer regions require 8 bytes (=4×2). Therefore, besides the non-delay region, the first delay region, and the second delay region, totally 8200 bytes (=8192+8) are required.

Further, in the case of the conventional technique where a checksum is stored in the SRAM, a checksum is calculated in page unit. As to a checksum of the other one of two dimensions, a checksum of values at the same offset addresses on one page is calculated, and this checksum is calculated for all the pages. In this case, 288 bytes (=256+32) are necessary for storing the checksums. Further, two timer regions require 8 bytes (=4×2). Therefore, besides the non-delay region, the first delay region, and the second delay region, totally 296 bytes (=288+8) are necessary.

In the present embodiment, when the EEPROM is 256 pages, 256 bits=32 bytes are necessary for the non-delay updating request flag region, the first delay updating request flag region, and the second delay updating request flag region. Further, two timer regions require 8 bytes (=4×2). Therefore, besides the non-delay region, the first delay region, and the second delay region, totally 40 bytes (=32+8) are necessary. In comparison with the conventional technique, the capacity of the SRAM necessary for writing restoration data into the EEPROM is the smallest.

As described above, in the present embodiment, the SRAM 23 is provided with the non-delay updating request flag regions F01 to F0N where the updating request flag is set when restoration data is stored in the non-delay regions D01 to D0N. Further, when a flag is set in the non-delay updating request flag regions F01 to F0N, the EEPROM writing section 12 writes the restoration data stored in the non-delay regions D01 to D0N corresponding to the non-delay updating request flag regions F01 to F0N into the EEPROM 3. Therefore, since a checksum is not calculated unlike the conventional technique, restoration data can be written into the EEPROM 3 by a simple process. The simplicity of the process that is simpler than the conventional technique can be understood also by comparing FIG. 2 illustrating the process in the present embodiment with FIG. 11 illustrating the conventional process.

Further, when a flag is set, "1" that is information with less data amount (1 bit) is stored in the non-delay updating request flag regions F01 to F0N. For this reason, a copy of restoration data and a checksum are not stored in the SRAM 23 unlike the conventional technique. As a result, restoration data can be written in the SRAM 23 without using a large capacity of the SRAM 23.

Further, in the present embodiment, when an updating request flag is set in the delay updating request flag regions F11 to F2m and an updating repression flag in the delay updating repression flag regions F1S and F2S is deleted, namely, the counting in the timer regions $TIMER_{D1}$ and $TIMER_{D2}$ continues for over the predetermined time, the EEPROM writing section 12 writes restoration data stored in the delay regions D11 to D2m corresponding to the delay updating request flag regions F11 to F2m into the EEPROM 3. That is to say, the EEPROM writing section 12 performs the delay writing. For this reason, the number of times of writing into the EEPROM 3 is repressed, and a life of the EEPROM 3 can be lengthened.

The above has described the embodiment of the present invention, but embodiments applicable to the present invention are not limited to the above embodiment, and thus as illustrated various modifications can be made suitably within the scope of the gist of the present invention.

The above embodiment illustrates the SRAM as the volatile memory. Not limited to this, the volatile memory may be a DRAM (Dynamic Random Access Memory) or the like. Further, the EEPROM is illustrated as the nonvolatile memory. Not limited to this, the nonvolatile memory may be a flash memory or the like.

In the above embodiment, data is written into the SRAM 23 and the EEPROM 3 by the CPU 21 according to the program (software process). Not limited to this, data may be written into the SRAM 23 and EEPROM 3 by hardware other than the CPU.

In the above embodiment, when a flag is set in the delay updating repression flag regions F1S and F2S, the EEPROM writing section 12 does not write the restoration data stored in the delay regions D11 to D2m into the EEPROM 3. Not limited to this, the delay updating repression flag regions F1S and F2S do not have to be provided in the SRAM 23. In this case, the EEPROM writing section 12 does not write the restoration data stored in the delay regions D11 to D2m into the EEPROM 3 until the timer regions $TIMER_{D1}$ and $TIMER_{D2}$ overflow. When the timer regions $TIMER_{D1}$ and $TIMER_{D2}$ overflow, namely, the counting in the timer regions $TIMER_{D1}$ and $TIMER_{D2}$ continues for over the predetermined time, the restoration data stored in the delay regions D11 to D2m may be written into the EEPROM 3.

The above embodiment has described the AV amplifier 1 as the electronic device to which the present invention is applied. The present invention is not limited to the AV amplifier, and it may be a personal computer or the like as long as the electronic device stores restoration data, which should be stored in the volatile memory even when power supply to a self device is shut off, and writes the restoration data into the nonvolatile memory.

The present invention can be applied to electronic devices such as an AV amplifier and a personal computer.

What is claimed is:

1. An electronic device comprising:
a nonvolatile memory;
a volatile memory having a first region where data that does not have to be restored is stored, a second region where restoration data that should be stored even when power supply to a self device is shut off is stored, a first flag region where a first flag is set correspondingly to the second region, a third region where the restoration data to be delayed and written into the nonvolatile memory is stored, a second flag region where a second flag is set correspondingly to the third region, and a timer region for counting a time;
a processor that includes:
a first writing section that writes data including the restoration data into the volatile memory; and
a second writing section that writes the restoration data stored in the second region into the nonvolatile memory, wherein
the first writing section sets the first flag in the first flag region corresponding to the second region where the restoration data is written,
when the first flag is set in the first flag region, the second writing section writes the restoration data stored in the second region corresponding to the first flag region into the nonvolatile memory, and
the first writing section sets the second flag in the second flag region corresponding to the third region where the restoration data is written and starts time counting in the timer region,
when the time counting in the timer region continues for over a predetermined time after the second flag is set in the second flag region, the second writing section writes the restoration data stored in the third region corresponding to the second flag region into the nonvolatile memory.

2. An electronic device comprising:
a nonvolatile memory;
a volatile memory having a first region where data that does not have to be restored is stored, a second region where restoration data that should be stored even when power supply to a self device is shut off is stored, a first flag region where a first flag is set correspondingly to the second region, a third region where the restoration data to be delayed and written into the nonvolatile memory is stored, a second flag region where a second flag is set correspondingly to the third region, a third flag region where a third flag for prohibiting writing of the restoration data into the nonvolatile memory is set, and a timer region for counting a time;
a processor that includes:
a first writing section that writes data including the restoration data into the volatile memory; and
a second writing section that writes the restoration data stored in the second region into the nonvolatile memory, wherein
the first writing section sets the first flag in the first flag region corresponding to the second region where the restoration data is written,
when the first flag is set in the first flag region, the second writing section writes the restoration data stored in the second region corresponding to the first flag region into the nonvolatile memory, and the first writing section sets the second flag in the second flag region corresponding to the third region where the restoration data is written, sets the third flag in the third flag region, and starts time counting in the timer region, when time counting in the timer region continues for over a predetermined time, deletes the third flag in the third flag region, when the second flag is set in the second flag region and the third flag is deleted in the third flag region, the second writing section writes the restoration data stored in the third region corresponding to the second flag region into the nonvolatile memory.

3. The electronic device according to claim 2, wherein the first writing section determines a region where the data is written based on an address of the volatile memory, when the determination is made that the restoration data is written into the second region, sets the first flag in the first flag region corresponding to the second region where the restoration data is written, when the determination is made that the restoration data is written into the third region, sets the second flag in the second flag region corresponding to the third region where the restoration data is written, sets the third flag in the third flag region, and starts time counting in the timer region.

* * * * *